United States Patent
Hawley (10) Patent No.: US 8,909,415 B1
(45) Date of Patent: Dec. 9, 2014

(54) VEHICLE AND PERSONAL SERVICE MONITORING AND ALERTING SYSTEMS

(76) Inventor: Chadwick Todd Hawley, Woodbridge, VA (US)

(*) Notice: Subject to any disclaimer, the term of this patent is extended or adjusted under 35 U.S.C. 154(b) by 0 days.

(21) Appl. No.: 13/600,321

(22) Filed: Aug. 31, 2012

Related U.S. Application Data (63) Continuation-in-part of application No. 12/477,079, filed on Jun. 2, 2009, now abandoned.

(51) Int. Cl.
*G01M 17/00* (2006.01)
*G06F 19/00* (2011.01)

(52) U.S. Cl.
USPC ........................................... 701/32.3

(58) Field of Classification Search
USPC .......... 701/32.3, 31.42, 33.2, 468; 455/404.1
See application file for complete search history.

(56) References Cited

U.S. PATENT DOCUMENTS 8,311,858 B2 * 11/2012 Everett et al. ................. 705/4
2010/0256859 A1 * 10/2010 Leyerle et al. ................. 701/32

* cited by examiner

*Primary Examiner* — Tan Q Nguyen
(74) *Attorney, Agent, or Firm* — Michael I. Kroll

(57) ABSTRACT

A portable multi-modal physics and environmental based signature information collection, analysis, and alerting apparatus, device and method capable of operating independently of vehicle diagnostic or alerting systems. Device uses algorithms and models to calculate, determine, and detect signature anomalies from accelerometer and other imbedded sensors for anomaly response to individual situations within the Automotive Global Information Grid. Wireless infrastructure provisioning of uniquely identified publisher and subscriber Automotive Network Centric Enterprise Services host subscriber and device holder as a persistent publisher presenting signature information on operational and environmental status and conditions. Onboard signature collection and anomaly detection device supports ISO MME and manufacture defined data formats, standard crash analysis algorithms based on ISO, SAE, FMVSS, CMVSS, EuoNCAP. Communications infrastructure is multi-modal providing auto alert capabilities. Machine to machine interface employs W3C standard telematics, event mark-up language, and the wireless communications utilizes cell phone, satellite, and other communications platforms.

10 Claims, 7 Drawing Sheets

VEHICLE AND PERSONAL SERVICE MONITORING AND ALERTING SYSTEMS

RELATED APPLICATIONS

This application is a Continuation-In-Part of U.S. patent application Ser. No. 12/477,079, having a filing date 2 Jun. 2009 now abandoned.

Please incorporate by reference all information in said provisional application into this instant application.

BACKGROUND OF THE INVENTION

1. Field of the Invention

The present invention relates generally to motor vehicles and, more specifically, to vehicle and personal service monitoring and alerting systems with capabilities, which overcome systems limitations of those warning systems that are hard-wired to proprietary onboard diagnostic and reporting systems, through a highly portable device enabled to detect a broad range of normal and emergency situations employing mathematic and rule based anomaly detection, modeling, and reporting of multiple mode signatures.

This invention comprises a portable device having communications infrastructure and sensor data to support multi-modal detection of emergency situations, geographic location, communication and confirmation of said situations to a Global Information Grid Network Centric Enterprise Service Center of automated and human agents and recording information from the Network Centric Enterprise Service Center emergency call center, which in turn communicates the location and emergency situation to appropriate emergency personnel. The device is designed to be extremely portable and configurable to move from vehicle to personal use as the user requires.

The legacy of this device is drawn from autonomous unmanned air and ground vehicles which utilize many sensor inputs to characterize, assess, and respond to the vehicle's environment. Adaptation of these micro-sensors and sophisticated algorithmic processing of the incoming sensory data allows for high confidence of detection of composite signatures associated Grid and its associated Network Centric Enterprise Services Architecture is drawn from the open systems Service Orientated Architecture (SOA) methodology which expounds best practices for the next generation of internet operations, communications, collaboration, security, interoperability, and services.

2. Description of the Prior Art

There are other systems designed for motor vehicle component monitoring. While these systems may be suitable for the purposes for which they where designed, they would not be as suitable for the purposes of the present invention as heretofore described.

It is thus desirable to provide a vehicle monitoring and alerting system incorporating a plurality of component sensors that conditionally communicate with a remote depository that aggregates vehicle data creating a queryable database that may initiate a vehicle alert from a call center.

It is further desirable to provide emergency assistance through real time acquisition of the vehicle location, which can then be relayed to an emergency response team.

SUMMARY OF THE PRESENT INVENTION

These redundant signature detection mechanisms provide the user with enhanced situational monitoring and detection of emergencies that includes transmission of geographic locations and or projected location, which are transmitted to a Global Information Grid and Network Centric Enterprise Service Center of automated and human agents that record and process information from the Network Centric Enterprise Service Center which in turn provides necessary location information to emergency response personnel.

A primary object of the present invention is to provide a portable multi-modal emergency situation anomaly detection and response system comprising a plurality of sensors to automatically detect anomalies and emergency situations within a motor vehicle.

Another object of the present invention is to provide a portable multi-modal emergency situation anomaly detection and response system wherein said plurality of sensors provides for receiving and analyzing abnormalities from onboard vehicle components.

Another object of the present invention is to provide a portable multi-modal emergency situation anomaly detection and response system wherein said plurality of sensors further provides for receiving and analyzing abnormalities onboard a vehicle and for receiving and analyzing abnormalities external to said vehicle.

Another object of the present invention is to provide a portable multi-modal emergency situation anomaly detection and response system wherein one of said sensors provides for determining the location of the subscriber and communicating said location to a call center.

Yet another object of the present invention is to provide a portable multi-modal emergency situation anomaly detection and response system additionally providing communication means whereby the call center can communicate with the subscriber.

Another object of the present invention is to provide a portable multi-modal emergency situation anomaly detection and response system having a global information grid incorporating a database that collects all subscriber sensor data thereby forming a world image subscriber knowledge base.

Another object of the present invention is to provide a portable multi-modal emergency situation anomaly detection and response system receiving real time sensor data from a subscriber vehicle whereby the call center can initiate communication with a user based concerning said real time sensor data.

Another object of the present invention is to provide a portable multi-modal emergency situation anomaly detection and response system receiving real time sensor data from a subscriber vehicle whereby the call center can initiate communication with a user to assess the situation and provide appropriate emergency response system or service.

Another object of the present invention is to provide a portable multi-modal emergency situation anomaly detection and response system receiving real time sensor data from a subscriber vehicle whereby the subscriber can contact the call center in regard to sensor data.

Another object of the present invention is to provide a portable multi-modal emergency situation anomaly detection and response system receiving real time sensor data wherein said call center can initiate a call to a subscriber and whereby the subscriber can contact the call center in regard to sensor data.

Still yet another object of the present invention is to provide a remote global information grid providing a communications module that is wirelessly compatible with existing legacy cell phone communications infrastructure to 802.11n.

Additional objects of the present invention will appear as the description proceeds. the present invention overcomes the shortcomings of the prior art by providing a portable device having communications infrastructure and sensor data to support multi-modal detection of emergency situations, geographic location, communication and confirmation of said situations to a Global Information Grid Network Centric Enterprise Service Center of automated and human agents and recording information from the Network Centric Enterprise Service Center emergency call center, which in turn communicates the location and emergency situation to appropriate emergency personnel. The device is designed to be extremely portable and configurable to move from vehicle to personal use as the user requires.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the figures illustrate the Vehicle and Personal Service Monitoring and Alerting System of the present invention. With regard to the reference numerals used, the following numbering is used throughout the various drawing figures.

10 Vehicle and Personal Service Monitoring and Alerting System of the present invention.
12 device for receiving and processing internal and external vehicle sensor data.
14 sensor and processing suite for receiving and analyzing abnormalities onboard a vehicle.
16 sensor and processing suite for publishing sensor information to a global information grid.
18 sensor and processing suite for receiving and analyzing abnormalities external to the vehicle.
20 sensor and processing suite for publishing sensor information and external environmental information to a remote system.
22 global positioning system for determining position and tracking of position of the vehicle.
24 a two way communication system between a user of the processing device and a Network Centric Enterprise Service Center.
26 an emergency alert communication system.
28 Help Me Now (HMN) Common Operating Picture (COP)
30 Composite Signatures Illustration
32 Composite/Multi-modal process for emergency detection
34 Emergency Event Domain Awareness
36 HMN Enterprise Semantic Enrollment/Adjudication Platform

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
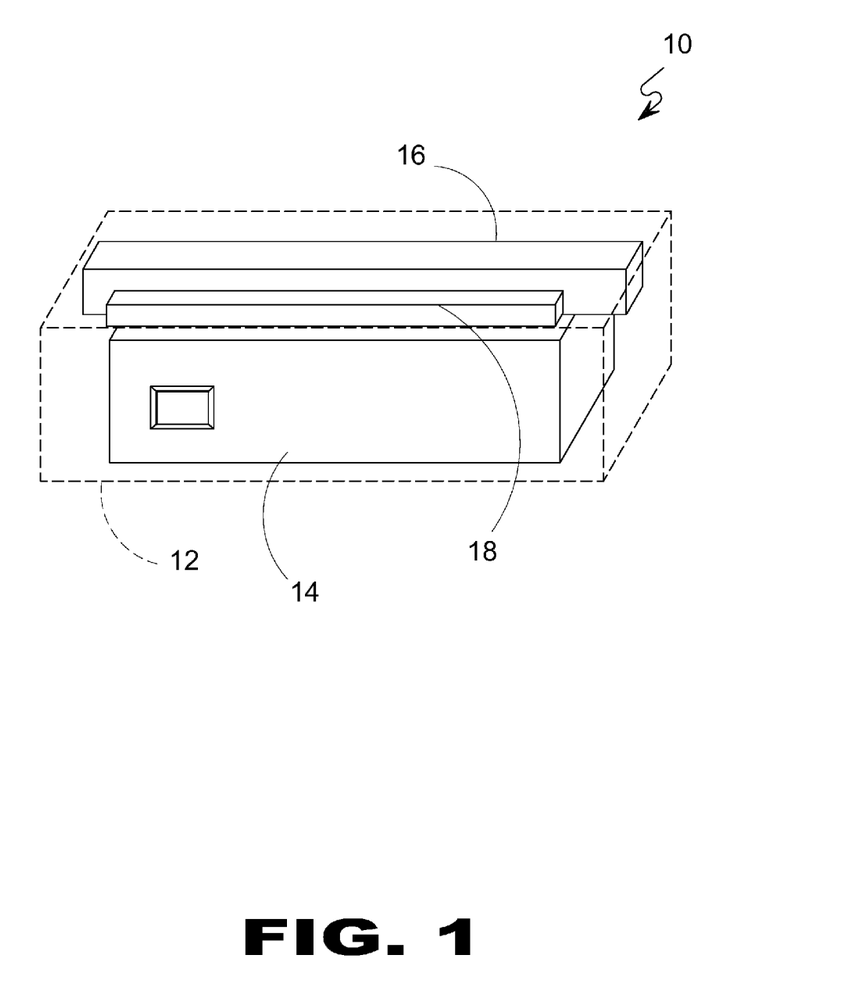
FIG. 1 is a diagram rendering of the embodiment of the Portable Multi-Modal Emergency Situation Anomaly Detection and Response System offered in its standalone configuration.
Figure 2:
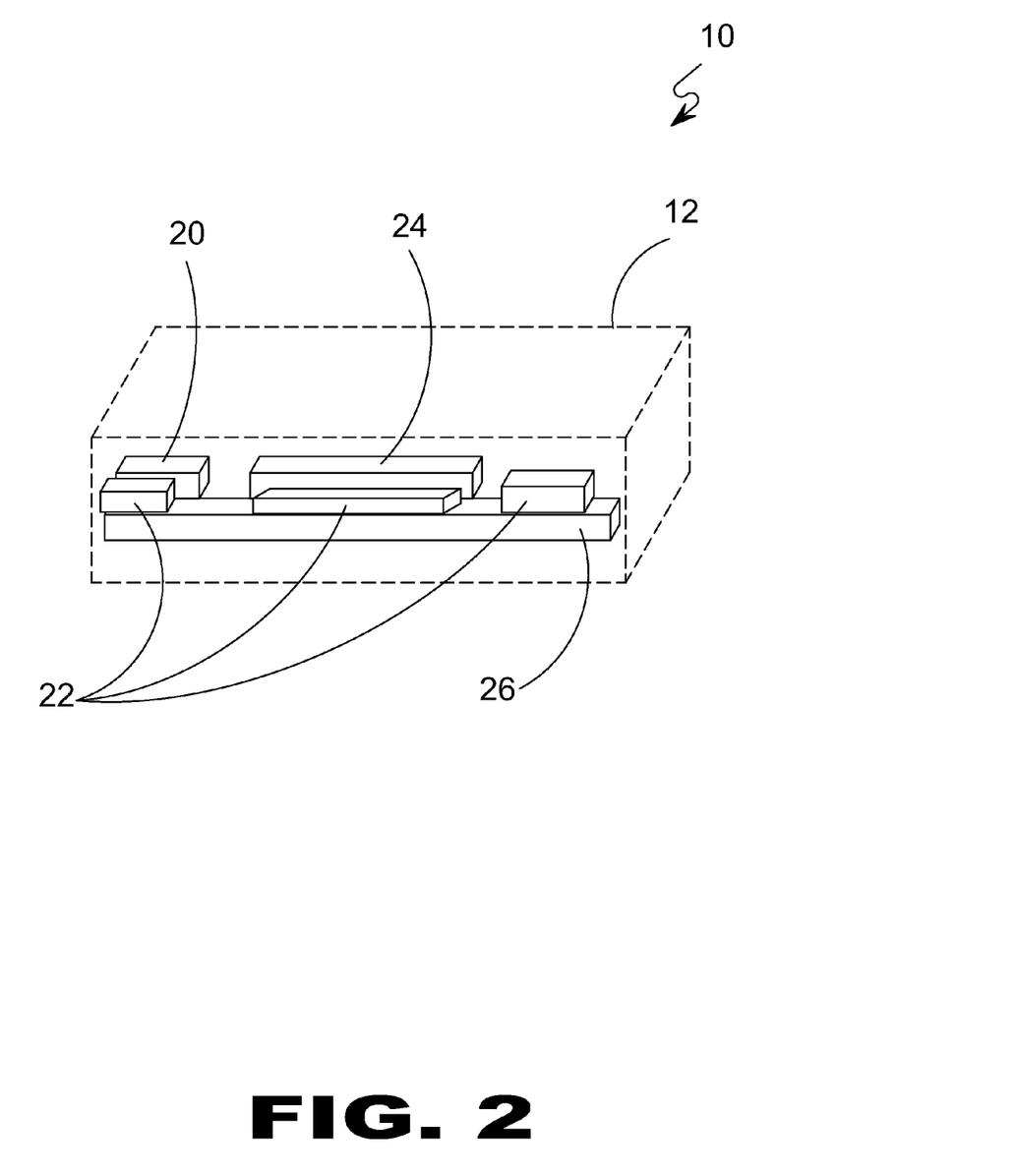
FIG. 2 is a diagram rendering of the embodiment of the functional elements of the Portable Multi-Modal Emergency Situation Anomaly Detection and Response System offered in its stand-alone configuration of FIG. 1.

Referring to FIGS. 1 and 2, shown are illustrative views of the of the programmable digital microprocessor device of the operational subscriber which is designed to be mounted onto a motor vehicle, such as any one of the nations 200 million automotive vehicles, to serve as an alert, communications, and collaboration platform comprising: a device housing 12 for receiving and processing internal and external vehicle sensor data, sensor and processing suite 14 for receiving and analyzing abnormalities onboard a vehicle; sensor and processing suite 16 for publishing sensor information to a global information grid; sensor and processing suite 18 for receiving and analyzing abnormalities external to the vehicle; sensor and processing suite 20 for publishing sensor information and external environmental information to a remote system; a global positioning system 22 for determining position and tracking of position of the vehicle; a two way communication system 24 between a user of the processing device and a Network Centric Enterprise Service Center and an emergency alert communication system 26.

This notification system is dependent upon the operational vehicle for battery regeneration power only and operational users, represented as subscribers become members of a network of devices where their individual identity is managed throughout a world modeled information collections network within a system that keeps them in direct contact with a Network Centric Enterprise Services organization.

This same device is structured to also serve as a data publisher of real time information related to the position, attitude, speed, and environmental elements to which the vehicle is currently exposed. This information is stored and processed by the Global Information Grid using a unique metadata standard mark-up language generating a world model.

Publishers such as advertisers, restaurants, gas stations, and other service or product providers also participate as publishers to the Global Information Grid. Data fusion, component agent analysis, anomaly detection, software knowledge agent monitoring and modeling, alert display, and event response flows both to and from the Portable Multi-Modal Emergency Situation Anomaly Detection and Response System producing both the means and methods of event analysis, anomaly detection, and automatic notification within the Global Information Grids Network Centric Enterprise Services common Operational Picture.

The alert notification and the interoperable communications are all a part of this same device. The user interface will vary however, the mobile processor and the Network Centric Enterprise Service server configuration will host its own database infrastructure designed to use the same voice and data network infrastructure.

Figure 3:
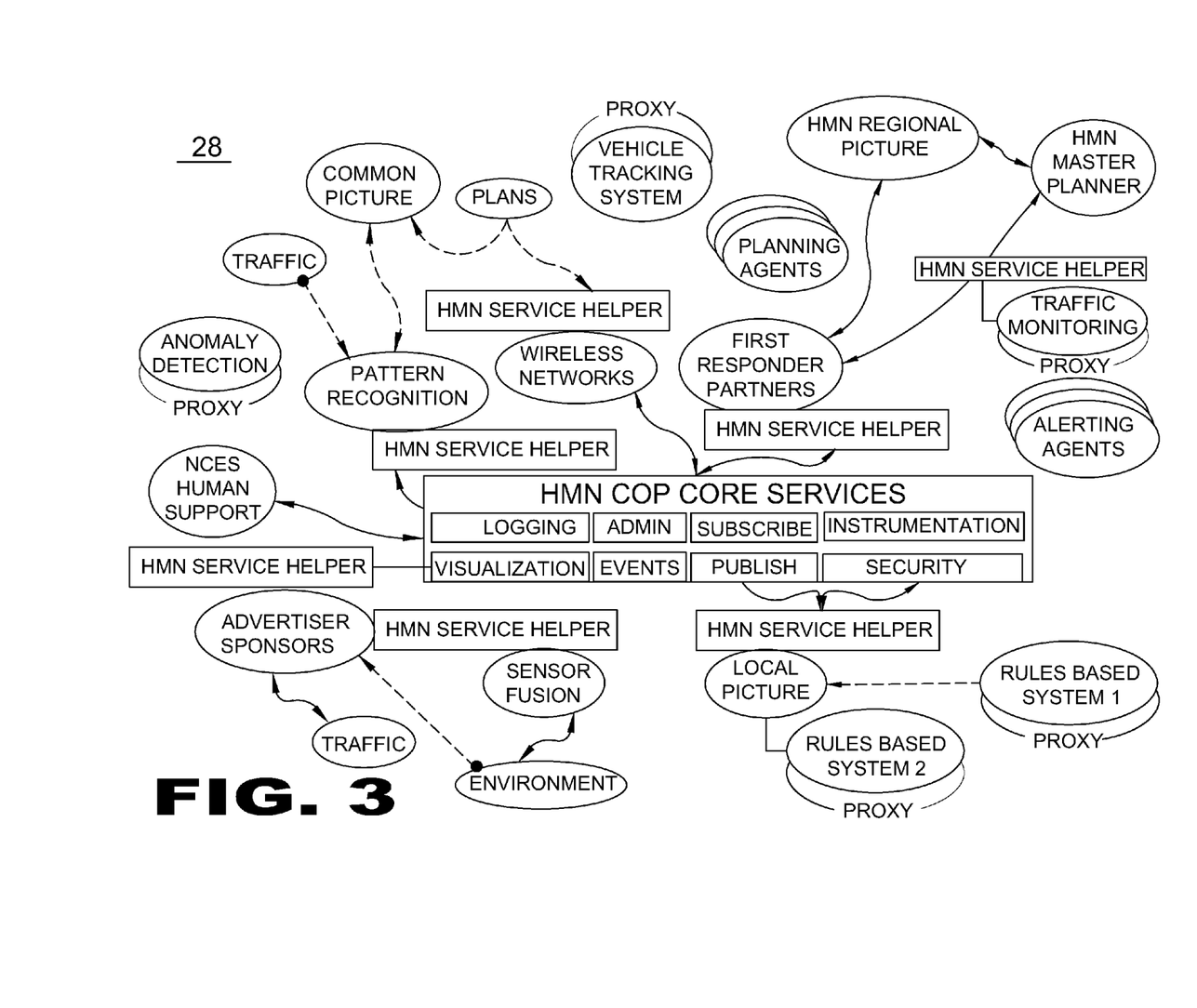
FIG. 3 is a notional diagram rendering of the embodiment of the Portable Multi-Modal Emergency Situation Anomaly Detection and Response Systems Global Information Grids Network Centric Enterprise Services common Operational Picture as offered in its operational component configuration which is designed to enable the invention of FIG. 1.

Referring to FIG. 3, shown is a notional diagram of the embodiment of the Portable Multi-Modal Emergency Situation Anomaly Detection and Response Systems Global Information Grids Network Centric Enterprise Services common Operational Picture (COP) 28 shown in its operational component configuration. The Grid environment serves as the primary communications interoperable interface for machine to machine and man to machine wireless communications. It is designed to be compatible with for multiple existing wireless platforms extending from existing legacy cell phone communications infrastructure to 802.11n for the specific intent to drastically increase on-board wireless data rates from 54 megabits per second as delivered by the existing 802.11g standard to 248 megabits per second within the onboard processor network.

This portion of the apparatus and this claim serves to identify this construct as the wireless communication infrastructure for current and future vehicle alert notification systems, such as brakes, tires, engine diagnostics, etc. This claim also takes into account that the apparatus and the infrastructure will use 802.11n wireless equipment to marry the onboard wireless networking of devices with network, identity, security, and system/application support.

This approach is specifically designed to apply the 802.11n capability with cellular and WiMax to form a seamless mobile WAN Global Information Grid architecture.

This portion of the claim is intended to identify the methodology for secure connectivity from any device, any network, and any location. All communications for on-board systems and throughout the Global Information Grid are bi-directional with the environmental and other future proposed sensors having the capability to operate as both wired and wireless devices, depending on the configuration. The system will connect to publicly available networks for access to public databases and content through the Internet and other open sourced venue. The system will also maintain an ability to operate as a closed system for internal corporate and law enforcement use. Law enforcement utilization will employ the wireless, communications, and database functions in conjunction with the 700 MHZ frequency spectrum as a primary claim under this submission.

Figure 4:
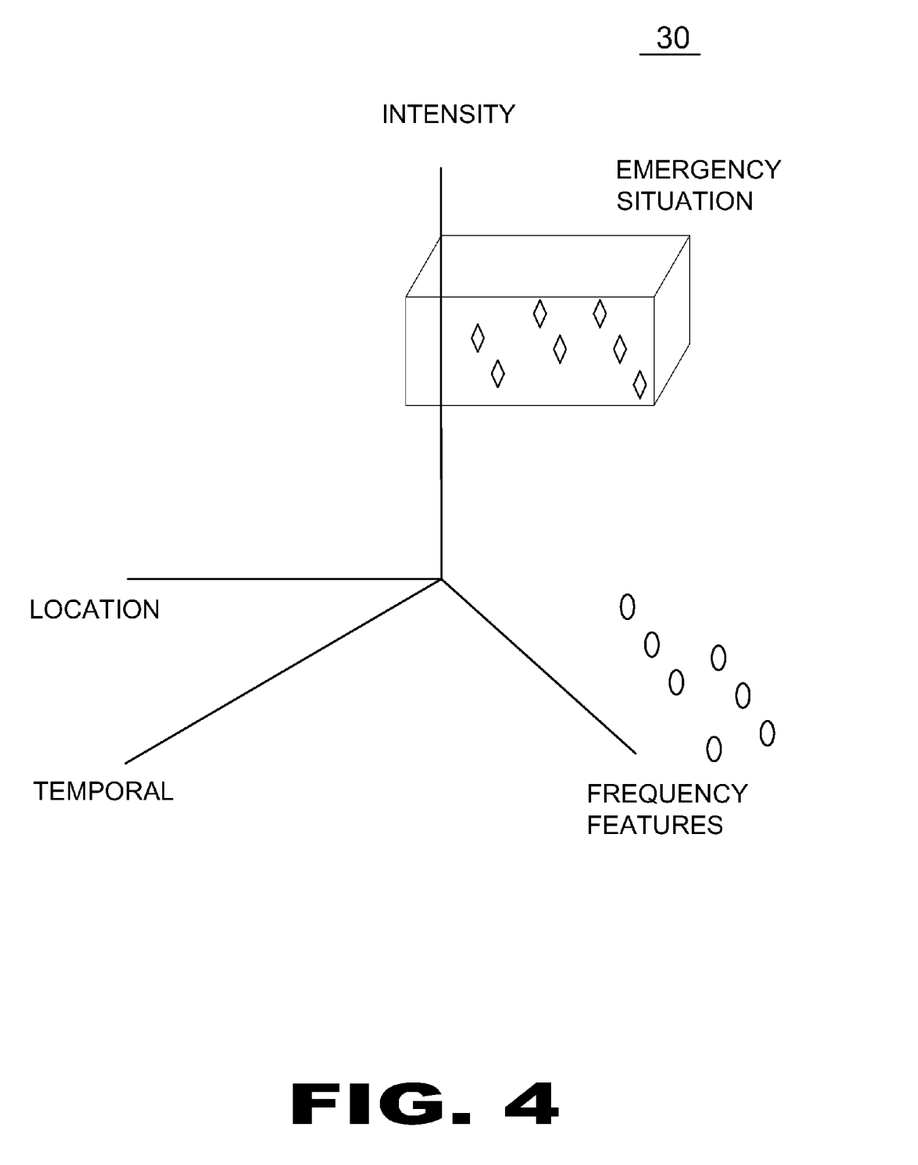
FIG. 4 is a notional diagram rendering of the embodiment of the Portable Multi-Modal Emergency Situation Anomaly Detection and Response Systems Sensor Fusion of Composite Signatures which are collected, analyzed, modeled, and configured for alert both locally to the individual subscriber device and onto the Global Information Grids Network Centric Enterprise Services common Operational Picture as offered in its operational detectable component and conditions configuration which is the embodiment of the inventions methodology which is used to monitor and access the conditions of the subscriber vehicle and is designed to support the invention of FIG. 1
Figure 5:
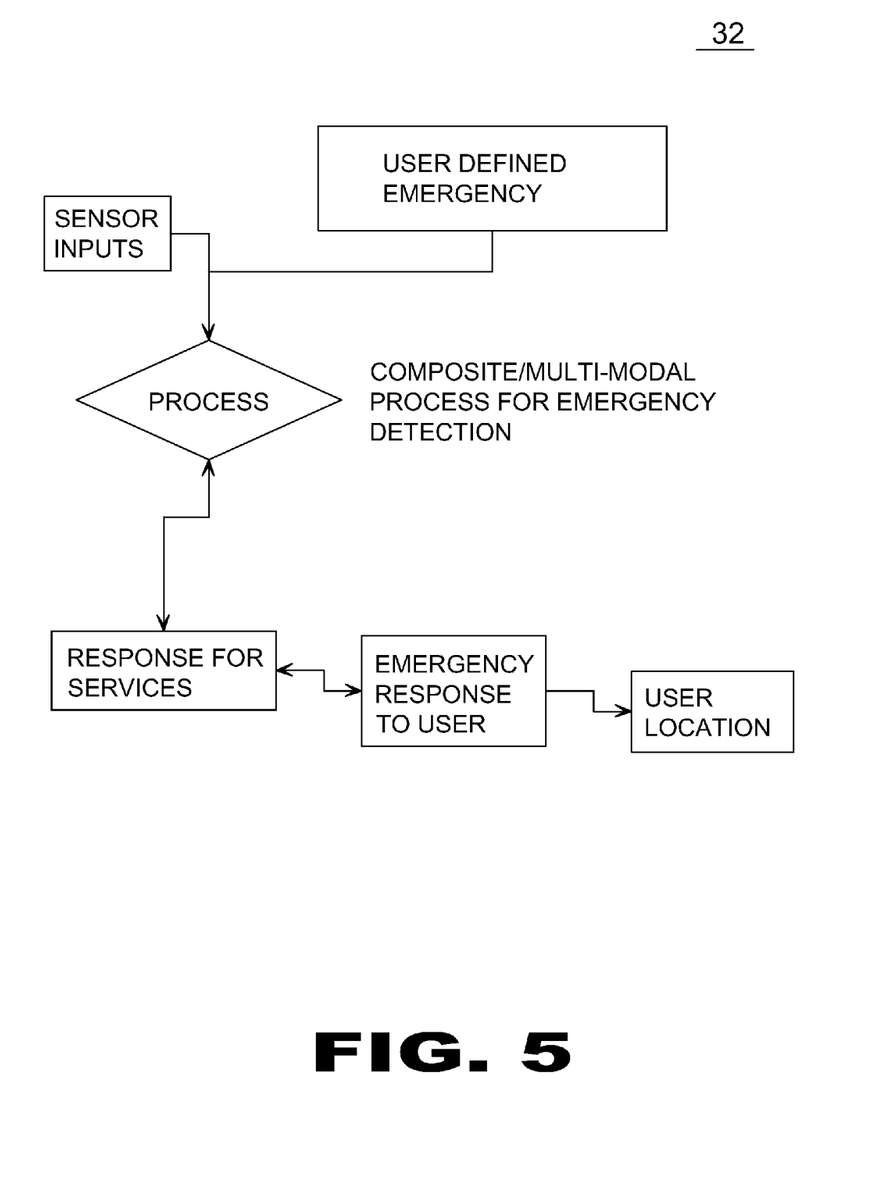
FIG. 5 is a notional diagram rendering of the flow diagram of the Portable Multi-Modal Emergency Situation Anomaly Detection and Response System which shows the means and methods of event analysis, anomaly detection, and automatic notification within the Global Information Grids Network Centric Enterprise Services common Operational Picture as offered in its operational component configuration which is designed to support the invention of FIG. 1.

Referring to FIGS. 4 and 5, shown is the spatial and temporal patterns mapped within a geospatial and content context. The manifold is a multi-dimensional space 30, 32 which encompasses the geographic attribute locations, spatial, temporal, and duration correlated to form a user preference decision surface which can be adapted as additional/refined multi-dimensional preference data is collected by the system. The resulting manifold tailored customer preference model is augmented with additional focused web based questionnaire and search preferences creating an evolving highly tailored and knowledge reinforcing user preference model.

The method begins with initial registration questions, which defines initial core customer interests. These interests are refined based on manifold analysis of customer pattern of life, which monitors spatial and temporal patterns mapped within a geospatial and content context. The manifold is a multi-dimensional space which encompasses the geographic attribute locations, spatial, temporal, and duration correlated to form a user preference decision surface which can be adapted as additional/refined multi-dimensional preference data that is collected by the system. The resulting manifold tailored customer preference model is augmented with additional focused web based questionnaire and search preferences creating an evolving highly tailored and knowledge reinforcing user preference model.

Figure 6:
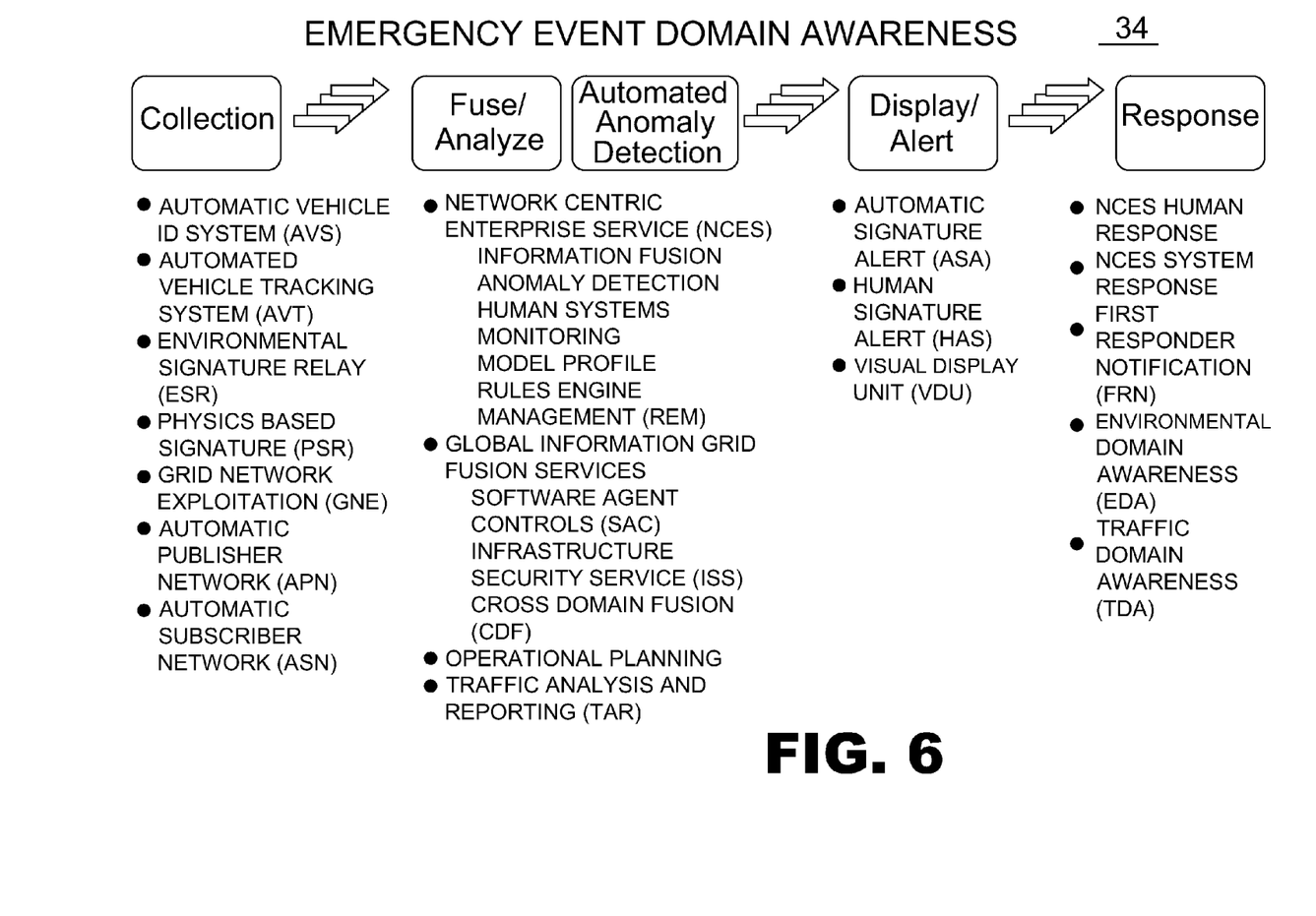
FIG. 6 is the detailed diagram rendering itemized summary of the operational information collection, data fusion and analysis, anomaly detection and modeling, alert display, and event response flow diagram of the Portable Multi-Modal Emergency Situation Anomaly Detection and Response System which shows the means and methods of event analysis, anomaly detection, and automatic notification within the Global Information Grids Network Centric Enterprise Services common Operational Picture as offered in its operational component configuration which is designed to support the invention of FIG. 1.
Figure 7:
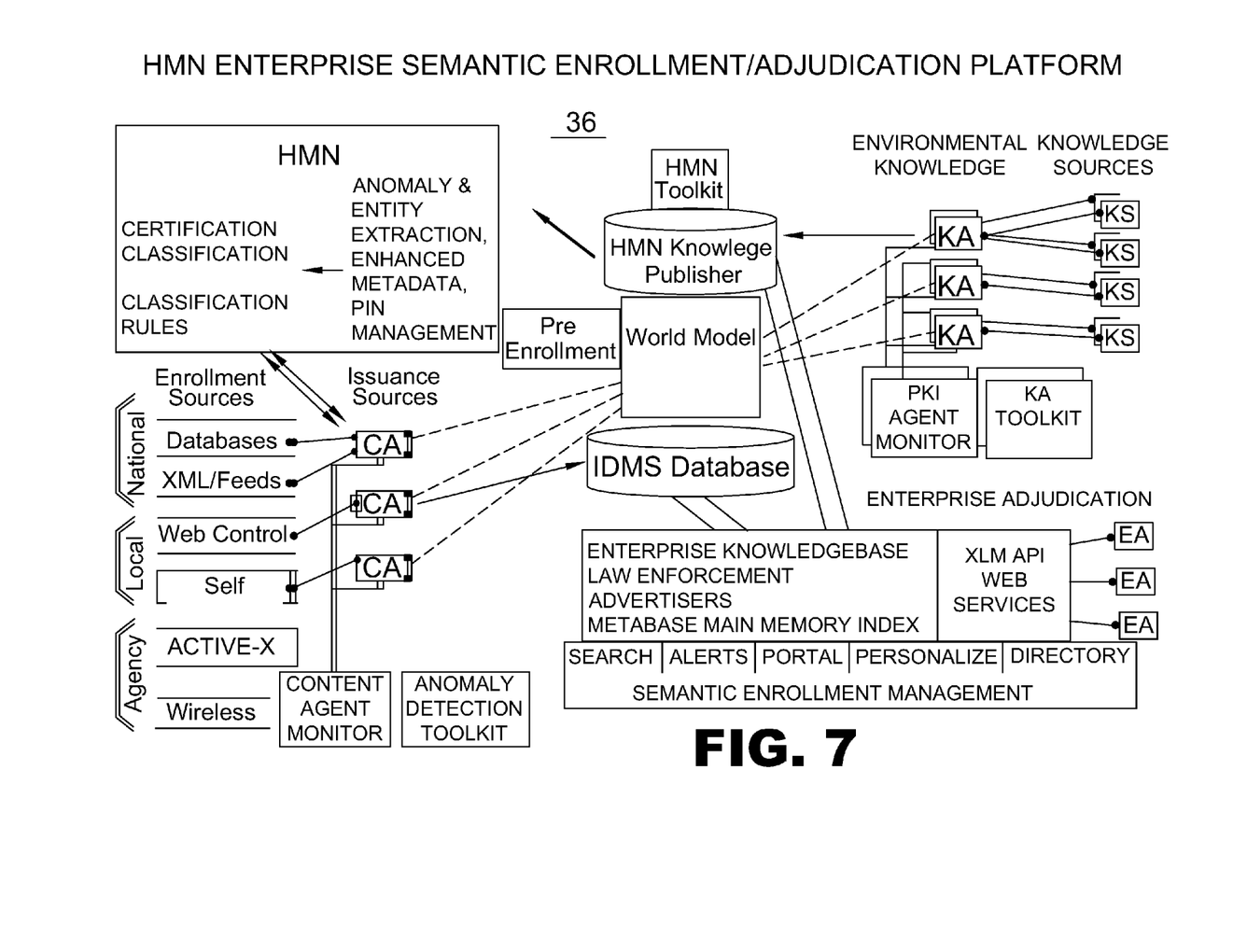
FIG. 7 is the detailed diagram rendering an itemized summary of the operational subscriber and operational publishers identity management information collections world model, data fusion, component agent analysis, anomaly detection, software knowledge agent monitoring and modeling, alert display, and event response flow diagram of the Portable Multi-Modal Emergency Situation Anomaly Detection and Response System which shows the means and methods of event analysis, anomaly detection, and automatic notification within the Global Information Grids Network Centric Enterprise Services common Operational Picture as offered in its operational component configuration which is incorporated into the device of FIG. 1.

Referring to FIGS. 6 and 7, depicted is the notional and operational diagram rendering of the embodiment of the Portable Multi-Modal Emergency Situation Anomaly Detection and Response Systems Sensor Fusion of Composite Signatures 34, 36 which include the data models which are collected, analyzed, modeled, and configured for alert both locally to the individual subscriber device and onto the Global Information Grids Network Centric Enterprise Services Common Operational Picture as offered in its operational detectable component and conditions configuration which is the embodiment of the invention's methodology that is used to monitor and access the conditions of the subscriber vehicle and is designed to support the invention. The Anomaly Detection and Response System is designed to identify and report non-obvious relationships and events that are precursors to a significant event of interest, which has been modeled or defined in rules. The specific physics or environmental based signature will allow appropriate alert or in the case of inclement whether, counter-measures to be taken to alert, prevent or moderate the previously defined behavior.

The device and its secure Network Centric Enterprise Services Global Information Grid web services subscribers and publishers includes an enterprise application which reduce analytic and information dissemination time by off-loading anomaly detection and analysis tasks from humans while providing increased situational awareness and visibility of the common operating picture within the complete Structured Vehicle Collaboration space.

The first activity of the anomaly detection and reporting system analysis is to perform the following:
a. Identify individual, vehicle make and model, location, and physics and environmental based events to be modeled, ex. Force of Gravity necessary to deploy a Side Air Bag within a 2007 Ford Explorer.
b. Identify precursors of individual, vehicle make and model, places, and physics and environmental based events of interest.
c. Identify data sources related to a and b, including access information, formatting information, and related properties necessary for utilization and presentation into a COP.
d. Identify algorithms that will utilize the identified data to generate the events of interest (anomaly detection algorithms)
e. Identify modes of surveillance to provide the most effective situational awareness
f. Identify Anomaly Detection and Response System event management service requires the system to post alerts, visualize, review, and manipulate the data and verbal communications policy within the Network Centric Enterprise Service environment.

The Second requirement of the Anomaly Detection and Response System requires these confirmation of potential comparative knowledge based data that will represent information related to those events of interest for alert models. Properties of those databases/data sources that are required for the anomaly models are processed for applicability, format, quality, size, and any other information that might impact the acquisition and use of the data in that particular database. The types of data of interest for the models include vehicle standards and crash data, geospatial data, speed, direction, and environmental data from weather stations, vehicles and other sensors.

Third, all Data is be made available to the Anomaly Detection and Response system through a Service Oriented Architecture enabled Extract Transfer Load (ETL) database application for normalization and cleansing prior to Anomaly analysis. The initial subsystems of the ETL architecture address the issues of understanding your source data, extracting the data and transferring it to the data warehouse environment where the ETL data and metadata systems can operate independent of the onboard anomaly detection operational systems. This will allow the adaptation of the SOA based systems necessary for data cleansing to cohabitate at the data layer thereby allowing anomaly detection and response to operate in three Cross Domain dimensions. While the remaining subsystems focus on the transforming, loading and system management within the ETL environment, the initial subsystems interface to the source systems to access the required data. The extract-related Anomaly Detection and response System ETL subsystems include:

Automotive and Event Data Profiling—investigates a data source to determine its fit for inclusion as a source and the associated cleaning and conforming requirements.

Automotive and Event Change Data Capture—Isolates the changes that occurred in the source system to reduce the ETL processing burden while positioning the optimum data to the algorithms for analysis.

Automotive and Event Extract System—Extracts and moves source data into the data warehouse environment for further processing.

Automotive and Event Cleansing and Conforming Data—This is where the Anomaly Detection and Response ETL system adds value to the data including but not limited to the allocation of geospatial and temporal metadata reference. The other activities, extracting and delivering data, are obviously important, but they simply move and load the data.

The cleaning and conforming subsystems change data and enhance its value to the anomaly detection and event notification analytical process. In addition, these subsystems create metadata used to diagnose source-system problems. Such diagnoses is used to prevent false positives and will lead business process engineering initiatives to address the root causes of dirty or non-conforming data and to insure data quality over time.

The system is designed to incorporate geospatial, commercial, and other content into the ETL data cleaning process. It is also expected to repair dirty data. The data warehouse is designed to provide an accurate picture of the data as it was captured by the Network Centric Enterprise Service production systems. It is essential to strike the proper balance between these conflicting goals. The ETL system is capable of correcting, rejecting or loading data as is, and then highlighting, with easy-to-use structures, modifications, standardizations, rules and assumptions of the underlying cleaning apparatus so as to allow the system to be self-documenting.

The five major ETL subsystems in the cleaning and conforming step include:

Automotive and Event Data Cleansing System—implements data quality processes to catch quality violations.

Automotive and Event Error Tracking—captures all error events that are vital inputs to data quality improvement.

Automotive and Event Audit Dimension Creation—attaches metadata to each fact table as a dimension. This metadata is available to applications for visibility into data quality.

Automotive and Event De-confliction/duplication—eliminates redundant members of core dimensions. This will require integration across multiple sources and application of survivorship rules to identify the most appropriate version of duplicate data.

Automotive and Event Data Conformance—enforces common dimension attributes across conformed Master Ontological and Taxonomical Dimensions (MOTD) and common metrics across related fact tables.

Given the proper availability and conformance of disparate data, the third phase of the Anomaly Detection and Response System analysis and model Anomaly investigation is to identify the types of algorithms for anomaly detection that will be applied to the types of data available from the Portable Multi-Modal Emergency Situation Anomaly Detection and Response System onboard processors and the identified data sources.

As other data sources are identified, these algorithms would be modified to include the additional information in the anomaly determination process. The selection of algorithms is important as illustrated in the following: The models for temporal data within the Portable Multi-Modal Emergency Situation Anomaly Detection and Response System are identified as autoregressive integrated moving average. One of the primary benefits of autoregressive integrated moving average models is their ability to correct for local trends in the data. Example, in the case of environmental considerations, the weather that has occurred on the previous day is incorporated into the forecast of what will happen today. Additionally environmental models based on current conditions are considered in conjunction with weighted guidelines. In event highway driving anomaly analysis, this works well in modeling natural and human behavior. Autoregressive integrated moving average models are fitted by least squares regression to find the values of the parameters which minimize the error term and will use Yule-Walker type equations to provide a fit and cross reference the solution with the Least Squares Fit method as a solution check and balance. The embodiment of the methodology is not solely dependent to a specific algorithmic cocktail.

The structural example presented below and its corresponding reference diagrams as exerted from 49 CFR present the governments own mandatory algorithm as utilized in Federal Motor Vehicle Safety Standard (FMVSS) certification with reference to Center of Gravity and is represented as follows: 49 CFR Ch. V ($10^{-1}$-04 Edition) at S6.2 Head injury criteria. (a)(1) For any two points in time, t1 and t2, during the event which are separated by not more than a 36 millisecond time interval and where t1 is less than t2, the head injury criterion (HIC36) shall be determined using the resultant head acceleration at the center of gravity of the dummy io head, are, expressed as a multiple of g (the acceleration of gravity) and shall be calculated . . . (2) The maximum calculated HIC36 value shall not exceed 1,000

These time series models as documented in existing crash test documentation for every vehicle make and model will be used for predicting current behavior and for forecasting the future behavior of variables. These vehicle behavior models accounts for the fact that data points taken over time will have a well defined internal structure related to items such as autocorrelation, trend or seasonal variation, which accounted for continuous model baseline update and modification. As a result standard regression techniques will be applied to time series data and methodology which has been developed to decompose the trend, seasonal and cyclical component of the series. Modeling the dynamic path of a variable serves to improve forecasts by having the predictable component of the series projected into the future.

The information below describing the differentiation of event consequence based on size of the individual is extracted from the same FMVSS CFR documentation. When this data is used in conjunction with the embodiment of this patent, many unique functional capabilities become available to the safety and security of vehicle operators and passengers. For the first time in the history of vehicle operations, under the embodiment of this patent, when the anomaly detection algorithms are applied to a specific vehicle, not only can the automated and human monitors at the Network Centric Enterprise Service command center alert first responders to the location of a crash scene, but they can also project to medical staff the potential for injury which may not be initially apparent given the obvious differentiation in effect of a 30 MPH crash on a 6 year old child as compared to a 95 year old male.

This same methodology will also extend the embodiment of the patent use for predicting or forecasting weather, traffic, or vehicle security "left of event" notification. The dynamic nature of automated system agents operated within the Global Information Grid are modeled to alleviate or minimize vehicle events such as chain reaction crashes based on both actual event notifications from existing subscriber notification as cross referenced with environmental sensor signature analysis.

In this case, the rates would be adjusted by the autoregressive integrated moving average model, thus providing an alarm from a non-obvious relationship being monitored or triggered every minute of every day throughout year. This provides a mathematical basis for cross correlating environment and physics based sensor alerts with actual event notification. This type of information may be used to assist in the performance of analytical task such as adjusting the deployment schedule of law enforcement, and other highway service provider assets which may be available to the Help Me Now (HMN) Common Operational Picture (COP) environment which, in and of itself is modeled for specific activity.

The COP is extensible based on its SOA Architecture for future work with the algorithms identified by other participating parties. Data input includes parameterized and aggregated data either in a single time series, an array time series, a text time series indexed by time, or a time index driven by supplementary field data comprising a categorical response from the sensor, geospatial, environmental and physics based network input. Each algorithm includes a number of parameters that may be set for regional differentiation. The individual analytic function is dependent on the structure of the input data and on the algorithm itself.

The information output and eventual alert is modeled and formalized as a set of scores, presented into a heterogeneous scores database. There are single score alerts and vectors of scores, for each input data point. Scores are compared to model thresholds. The scores in a group are related as (i) scores from the same time series across successive time points, and (ii) scores across different time series (from the same or different data sectors) where subject matter expertise indicates that the time series are related.

Anomalies are categorized as an event (keyed by geography, data feed, conditions, or time), where the event score exceeds a preset threshold. In the statistical anomaly detection setting, an event contains a score, the algorithm, and the algorithm parameters. If score >=threshold (geography, data feed, environmental conditions, time, algorithm, algorithm parameters), then the event is an anomaly.

The success of the Asymmetric Automotive Alert (AAA) system is based on the random formalization of the intuitive idea of the subscriber network and publisher network organizations taking independent successive steps through individual social networks, each individual moving in a random direction.

In nature the path traced by a molecule as it travels in a liquid or a gas is random. The travel of individual subscribers is much more predictable based on the general repeatable path to logical destitutions. The mathematical representation of the "drunkard's random walk" is a notational representation within the Global information Grid to which multiple elements of the Network Centric Enterprise Service may be triggered.

The notation AR(p) refers to the autoregressive model of order p. The AR(p) model is written $X_t = +P_i X_{t-i} + \epsilon_t$
where P1, . . . , Pp are the parameters of the model, c is a constant and $\epsilon_t$ is an error term.

In the case of the Anomaly Detection and Response Systems autoregressive model is essentially an infinite impulse response with some additional interpretation placed on it which can be adjusted to conform to the individual problem. This will allow the system to have simple wizards to which the anomaly detection analysis becomes available and useable to the lowest level of experience or training within the operating center. The use of the system, its content, and/or its analytics by subscribers, publishers, call center response personnel and others are modeled specific to their operational needs without exposing core means, methods, or algorithms is also a benefit that drives the ease of use.

The embodiment of the Asymmetric Automotive Alert system is programmable and compatible with geospatial, internet, telephone, pager and other communications devices. This capability allows individuals (parents, employers) to employ their own models through features available through their web based system access. Given the SOA based open system architecture, this system allows for access to existing telephone and other onboard or mobile GPS tracking systems. Given the web based access of the system, corporations may couple the AAA system use to their own internal production and shipping systems for alert notification or those of established logistical shippers such as UPS or Federal Express. Service Providers such as Cable Installers, Home Product Repair Technicians, Plumbers, Exterminators, can couple the automated or human alert notification system to extend an automatic Asymmetric Customer Alerts, thereby providing extended service while maximizing worker productivity. Given the web based nature of the system it is compatible with existing mobile reporting systems which may not have a dynamic communication reporting capability.

The embodiment and automated nature of the system and the wireless nature of the infrastructure also makes the detailed embodiment of the system intentionally and unequally compatible with existing satellite communications devices and network infrastructure such as XM, Sirius, Iritium, and others.

Multiple applications from alert notification to interactive command and control communications will serve to extend the functional capabilities of these networks. The embodiment of the interactive nature of the device and the system also allows for payment through well established on-line functions with invoicing capabilities existing within the Network Centric Enterprise Services infrastructure.

The embodiment of the device and the system provides an ability to reduce the device capabilities to the circuit board and chip set level also makes the mobility of the devise and the extension of the Global Information Grid extensible to existing telephone, radio, pager, laptop, alert and monitoring devices as imbedded capabilities for subscriber, publisher, or interactive use. The imbedded use of the chip and the wireless communications infrastructure could, for example make vehicle theft obsolete without the owner ever having to become involved with the monthly service fee for Network Centric Enterprise Services by the activation of a remote "Asymmetric Automotive Kill Switch".

It is understood that this invention is a categorical departure from hard-wired event discovery and reporting systems, however many of the elements produced in the description of this art may be transferable to those proprietary systems. The information, methodology, algorithms, means, and methods expressed in this invention will be embodied in other submittals as both an extension and clarification of this submittal while maintaining the spirit, intent, and character herewith. Therefore, it should be understood that the information and descriptions disclosed here are for descriptive purposes and shall not be construed to limit in any way the confines of the invention as submitted.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A portable multi-modal emergency situation anomaly detection and response system comprising:
   a) a portable subscriber device in a motor vehicle having a multi-mode signature sensor and processing suite receiving data from said sensor responsive to a component of said motor vehicle to automatically detect anomalies and emergency situations within said motor vehicle;
   b) said device having a motor vehicle external sensor in communication with said multi-mode signature sensor and processing suite receiving environmental data external to the motor vehicle for receiving and analyzing abnormalities external to said motor vehicle;
   c) a communications infrastructure in said device providing two way communication between a subscribing vehicle user in said motor vehicle and a global information grid, said communications infrastructure for publishing sensor information from the vehicle's internal and external sensors to said remote global information grid, said remote information grid collecting, analyzing, modeling natural and human behavior, and configured to alert the subscriber device and user in said motor vehicle identifying and reporting non-obvious relationships and events that are precursors to a significant event of interest, and countermeasures to be taken to prevent or moderate said previously defined behavior;
   d) a global positioning system in said device for determining the real time location of the sensor enabled vehicle; and
   e) said portable device being movable by said subscriber user from one motor vehicle to another motor vehicle, said device containing all of said sensors and said communication infrastructure.

2. The portable multi-modal emergency situation anomaly detection and response system of claim 1, providing a plurality of vehicle component sensors and processing suites for a plurality of vehicle components for analyzing the plurality of sensors for vehicle component abnormalities.

3. The portable multi-modal emergency situation anomaly detection and response system device of claim 1, providing a plurality of external vehicle sensors and processing suites for analyzing environmental data external to the motor vehicle.

4. The portable multi-modal emergency situation anomaly detection and response system device of claim 1, whereby said device containing all of said sensors and said communication infrastructure, and said portable device being movable by said subscriber user from one motor vehicle to another motor vehicle, said subscriber user is able to access all features of said multi-modal emergency situation anomaly detection and response system in said another motor vehicle.

5. The portable multi-modal emergency situation anomaly detection and response system device of claim 1 wherein said processing suite includes anomaly and event models to support analyzing abnormalities onboard the vehicle.

6. The portable multi-modal emergency situation anomaly detection and response system device of claim 2 wherein said global information grid includes a call center for providing said alert to said subscriber device and user, and also to alert first responders to the location of a crash scene and also to project to medical staff the potential for injury.

7. The portable multi-modal emergency situation anomaly detection and response system device of claim 1 in which said remote global information grid receives input from advertisers, restaurants, gas stations and other service and product providers.

8. The portable multi-modal emergency situation anomaly detection and response system device of claim 1 wherein said sensor data is taken from the group of temporal, intensity, frequency, temperature, pressure and geospatial.

9. The portable multi-modal emergency situation anomaly detection and response system device of claim 8 wherein said data is used to create component analytic models.

10. The portable multi-modal emergency situation anomaly detection and response system device of claim 9 wherein said analytic models form a basis for determining component anomalies.

\* \* \* \* \*